(12) United States Patent
Katta et al.

(10) Patent No.: US 12,507,048 B2
(45) Date of Patent: Dec. 23, 2025

(54) VIRTUALIZED ROAD-SIDE UNITS FOR VEHICLE-TO-EVERYTHING COMMUNICATION

(71) Applicant: Harman International Industries, Incorporated, Stamford, CT (US)

(72) Inventors: Navin Chandra Rao Katta, Fremont, CA (US); Harshawardhan Vipat, San Jose, CA (US); Sean William Mooney, San Jose, CA (US); Tithi Bharat Patel, Gujarat (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 520 days.

(21) Appl. No.: 18/060,475

(22) Filed: Nov. 30, 2022

(65) Prior Publication Data

US 2023/0199449 A1 Jun. 22, 2023

(30) Foreign Application Priority Data

Dec. 17, 2021 (IN) .............................. 202141058888

(51) Int. Cl.
*H04W 4/44* (2018.01)
*H04W 76/10* (2018.01)
(52) U.S. Cl.
CPC ............. *H04W 4/44* (2018.02); *H04W 76/10* (2018.02)
(58) Field of Classification Search
CPC ................................ H04W 4/44; H04W 76/10
See application file for complete search history.

(56) References Cited

U.S. PATENT DOCUMENTS

| 2019/0132709 | A1 | 5/2019 | Graefe et al. |
| 2019/0140919 | A1 | 5/2019 | Smith et al. |
| 2019/0316919 | A1 | 10/2019 | Keshavamurthy et al. |
| 2020/0336375 | A1 | 10/2020 | Ucar et al. |

(Continued)

FOREIGN PATENT DOCUMENTS

| EP | 3314918 B1 | 8/2020 |
| KR | 102103823 B1 | 4/2020 |

OTHER PUBLICATIONS

European Patent Office, Extended European Search Report Issued in Application No. 22213082.5, Apr. 19, 2023, Germany, 11 pages.

*Primary Examiner* — Ajay Cattungal
(74) *Attorney, Agent, or Firm* — McCoy Russell LLP

(57) ABSTRACT

Disclosed herein are systems and methods for implementing virtualized Road-Side Units (vRSUs). Edge computing devices implementing one or more vRSU services may associate vehicles with identifiers that are based at least in part upon the locations of the vehicles. The locations may be established by location services of the edge computing devices, based upon communication received from the vehicles via wireless cellular communication links. The edge computing devices may then process infrastructure information that they receive, for distribution to the vehicles, at the vRSU services. Based upon the processing of infrastructure information at the vRSU services, messages may be generated for transmission to the vehicles (e.g., over the wireless cellular communication links), with the messages carrying information based upon the infrastructure information, such as in the form of safety messages and/or information messages.

16 Claims, 6 Drawing Sheets

(56) References Cited

U.S. PATENT DOCUMENTS

| | | | |
|---|---|---|---|
| 2023/0028885 A1* | 1/2023 | Mukherjee | H04W 4/44 |
| 2023/0041885 A1* | 2/2023 | Nakamura | H04W 4/40 |
| 2023/0043040 A1* | 2/2023 | Cooper | B62J 45/416 |
| 2023/0055627 A1* | 2/2023 | Balasubramanian | G01S 5/0268 |
| 2023/0056581 A1* | 2/2023 | Song | B60W 60/0015 |
| 2023/0057641 A1* | 2/2023 | Soryal | H04W 12/0471 |
| 2023/0119247 A1* | 4/2023 | Weksler | G06Q 20/3276 |
| | | | 455/41.2 |
| 2023/0141416 A1* | 5/2023 | Kulkarni | H04W 4/44 |
| | | | 701/423 |
| 2023/0147739 A1* | 5/2023 | Du | G01S 7/4972 |
| | | | 356/4.01 |
| 2023/0148114 A1* | 5/2023 | Hiei | B60W 50/14 |
| | | | 340/932.2 |
| 2023/0252897 A1* | 8/2023 | Montemurro | H04W 4/44 |
| | | | 340/905 |

\* cited by examiner

VIRTUALIZED ROAD-SIDE UNITS FOR VEHICLE-TO-EVERYTHING COMMUNICATION

CROSS REFERENCE TO RELATED APPLICATIONS

The present application claims priority to Indian Patent Application No. 202141058888, entitled "VIRTUALIZED ROAD-SIDE UNITS FOR VEHICLE-TO-EVERYTHING COMMUNICATION", and filed on Dec. 17, 2021. The entire contents of the above-listed application is hereby incorporated by reference for all purposes.

FIELD

The disclosure relates to methods and systems for virtualizing Road-Side Units (RSUs) of vehicular communication systems.

BACKGROUND

Vehicle-to-everything (V2X) systems are cooperative systems in which vehicles exchange information with other vehicles, e.g., via Vehicle-to-Vehicle (V2V) communication, and with roadside infrastructure, e.g., via Vehicle-to-Infrastructure (V2I) communication, in order to achieve higher levels of safety, comfort, and roadway efficiencies. While V2V communication may be used to enhance driver safety, V2I communication may play an important role in the dissemination of information about a driving environment to vehicles. Road-Side Units (RSUs) mounted at intersections and along roadways may broadcast various information (such as roadwork information, map information, and/or traffic-light information) to vehicles using V2I messaging. Such information may be used by in-vehicle V2I applications in order to improve driving, powertrain, and/or environmental efficiencies. Such information may also be used for safe operation of autonomous vehicles.

RSUs may be installed by the roadside, as part of the infrastructure of a city or a Road Operator (RO), and may have backhaul connectivity to a Traffic Management Center (TMC) (e.g., over an RO's wired network and/or fiber network). The RSUs and various vehicles may be equipped with radio technologies, such as Dedicated Short Range Communication (DSRC) and/or Cellular V2X (CV2X) radio technologies, that may allow them to directly communicate with vehicles, such as via sidelink connections. Sidelink connections may have limited range, which may implicitly impact the nature of possible localization in the system. RSUs may broadcast V2I messages over sidelink connections, which may be received by various vehicles in the coverage area of the RSU, and may be processed by each of the vehicles in implementing various V2I use cases. RSUs may also communicate to TMCs over wired connections (e.g., backhaul connections).

An RSU may have various hardware components and software layers. The hardware components of an RSU may include, for example, a general purpose host Central Processing Unit (CPU), a persistent storage device, one or more modems for radio communication, and a Hardware Security Module (HSM). The operating system, various software services, and various applications may run on the host CPU. Security credentials and/or configuration information may be saved on the persistent storage device. Message signing may be performed on the HSM. The HSM may be a component compliant with Federal Information Processing Standard (FIPS) Publication 140-2 140-2 Level 3, and may store private signing keys. The private keys may be protected and might be prevented from leaving the HSM.

The software layers may include, for example, a standards layer, a services layer (e.g., for RSU services), a base applications layer (e.g., for basic applications), an interface layer, and/or an advanced applications layer. The standards layer may encompass software components that are responsible for handling encoding and/or decoding of V2X standards compliant messages and for implementing V2X networking standards and related protocols for transporting messages (e.g., over DSRC radios and/or CV2X radios). In addition, this layer may implement V2X security components which comply formats for security credentials such as certificates, and may implement protocols and/or algorithms for secure signing and verification of V2X messages.

The services layer may implement services, such as services in compliance with the United States Department of Transportation (USDOT) RSU Specification version 4.1, that may enable an RSU to transmit messages to and/or receive messages from an external entity. These services may use rely either on a backhaul connection, or on components in the standards layer, to send, receive, sign, and verify messages.

The base applications layer may include basic applications for transmitting standard V2I messages from the RSU, such as those defined by the Society of Automotive Engineers (SAE) and/or SAE International. These may include Signal Phase and Timing (SPaT) messages, map messages (MAP), and Traveler Information Message (TIM) messages, among others.

The interface layer and advanced applications layer may include components that enable the RSU to interface with and/or be managed by external entities. A Simple Network Management Protocol (SNMP) agent may enable remote management of configuration over SNMP, while a Traffic Controller Interface module may enable connectivity with various controllers at intersections for receiving SPaT messages and transmitting signal priority and/or pre-emption commands to control traffic lights.

However, the inventors herein have recognized potential issues of such systems. Such systems may rely upon physical RSUs being deployed everywhere. Moreover, RSUs may rely upon backhaul connectivity and/or internet connectivity, which may introduce increased costs and roll out challenges. The maintenance of physical RSUs may be time consuming and/or expensive. Such systems may also rely upon vehicles having On-Board Units (OBUs) equipped with sidelink radio technology and running various V2X application stacks. These new technologies may come at an additional cost and may increase risks of failure risks for automotive Original Equipment Manufacturers (OEMs). In some cases, such systems may rely upon a dedicated radio spectrum. Moreover, sidelink communication may have limited range and/or bandwidth, which may make it difficult (or even impossible) to implement features for multi-intersection use cases.

Accordingly, getting infrastructure information to vehicles in such systems has been challenging, due to the slow adoption of V2X technology (e.g., by auto manufacturers) and delays in the rollout and deployment of V2X infrastructure equipment (such as RSUs).

SUMMARY

The methods and systems disclosed herein may facilitate the provision of infrastructure information to vehicles through the use of virtualized RSUs (vRSUs) and wireless cellular communication technologies, such as fourth-generation (4G) and/or fifth-generation (5G) wireless cellular communication technologies promulgated by the 3rd Generation Partnership Project (3GPP). The vRSUs may be instantiated at a network's edge, closer to vehicles and roadway infrastructure—e.g., on edge servers inside an operator's network—which may advantageously enhance latency and/or localization performance for various V2I use cases.

In some embodiments, the issues described above may be addressed by methods in which a vehicle is associated with an identifier based at least in part upon a location of the vehicle, with the association being performed by a location service of a computing device, such as an edge computing device. A set of infrastructure information associated with the identifier (e.g., information received by the computing device) may be processed at a vRSU service of the computing device. Based upon the processing of the set of infrastructure information at the vRSU service, a message may be generated for transmission to the vehicle, such as over a wireless cellular communication link. The message may be based upon the set of infrastructure information, and in various embodiments may be a safety message and/or an information message. In this way, by preparing infrastructure messages for transmission to vehicles directly over a wireless cellular communications link (and then transmitting them), burdensome sidelink communication technologies may be avoided.

For some embodiments, the issues described above may be addressed by methods of virtualizing RSUs, in which a point-to-point connection may be established between a computing device and a vehicle over an interface for a wireless cellular communication link (e.g., an interface of an edge computing device to such a link). A transmission from the vehicle carrying a set of location information of the vehicle may be processed, and the vehicle may be associated with an identifier based at least in part upon the set of location information. A set of infrastructure information associated with the identifier may be processed at a vRSU service of the computing device, such as by virtue of being published to the identifier by an infrastructure element having infrastructure information pertinent to the identifier. Based upon the processing of the set of infrastructure information associated with the identifier, a message may be generated for transmission to the vehicle over the interface for the wireless cellular communication link, for example by virtue of the vehicle having a subscription to information associated with the identifier. In this way, by implementing a publisher/subscriber model of communication, point-to-point wireless cellular communication may enable the avoidance of burdensome broadcast-based wireless communication approaches.

For some embodiments, the issues described above may be addressed by vRSU systems having antennas supporting transmission and reception between the system and a vehicle over wireless cellular communication links. The systems may establish point-to-point connections over the wireless cellular communication links and process transmissions from vehicles carrying location information of the vehicles. The systems may associate vehicles with identifiers, via location services of the systems. The identifiers may be based at least in part upon the location information of the vehicles. The systems may establish subscriptions to the identifiers on behalf of the vehicles. Upon receipt of infrastructure information associated with the identifiers, the systems may process the infrastructure information received at vRSU services of the systems, and publish the infrastructure information to the identifiers, and generate messages for transmission to the vehicles (e.g., over the wireless cellular communication links). The messages may carry the infrastructure information published to the identifiers. In this way, vRSU systems may advantageously bring infrastructure-related V2X communications closer to vehicles, without the expense of dedicated RSU hardware.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
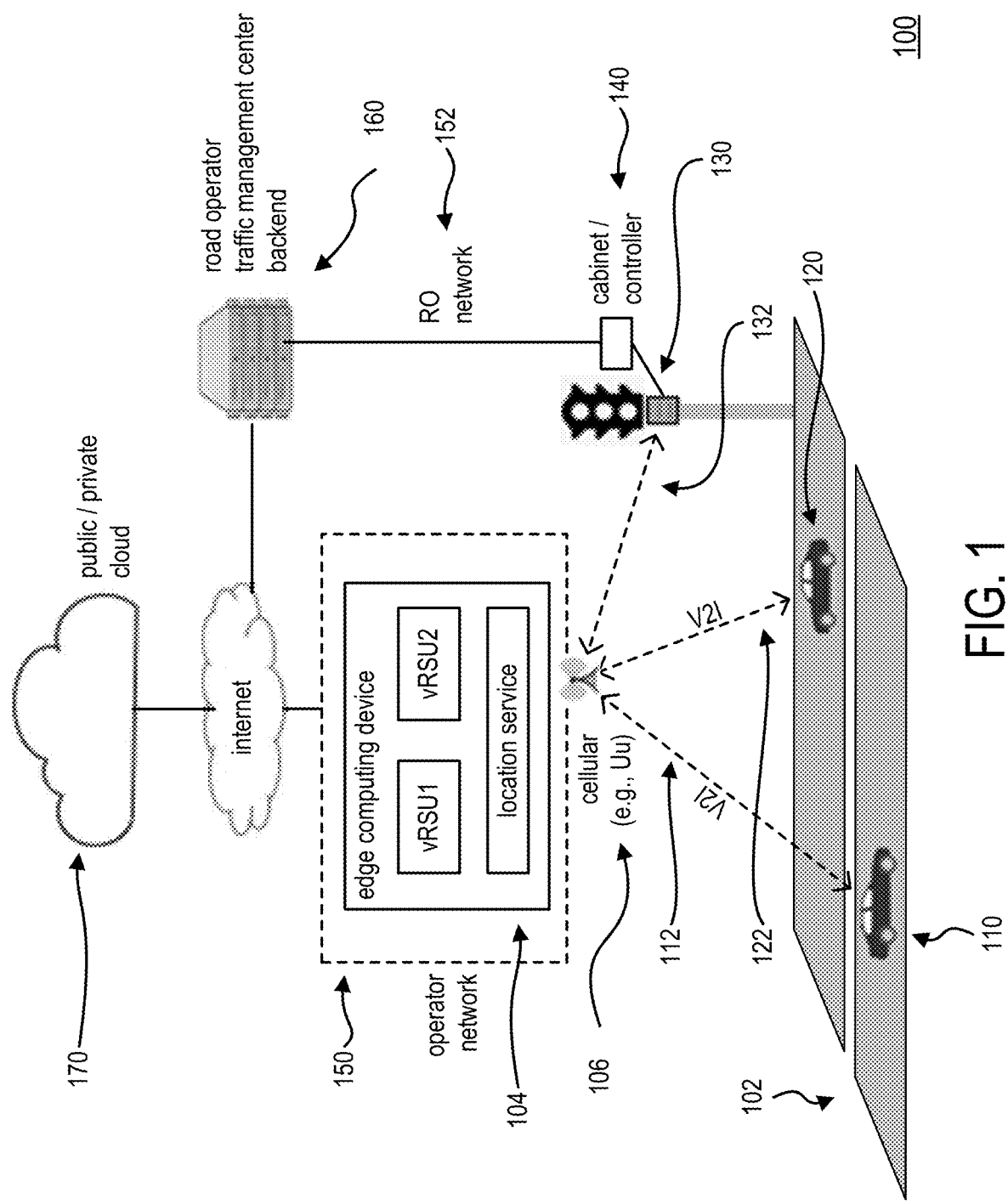
FIG. 1 shows a scenario of the deployment of virtualized Road-Side Units (vRSUs) for Vehicle-to-Everything (V2X) communication, in accordance with one or more embodiments of the present disclosure.
Figure 2:
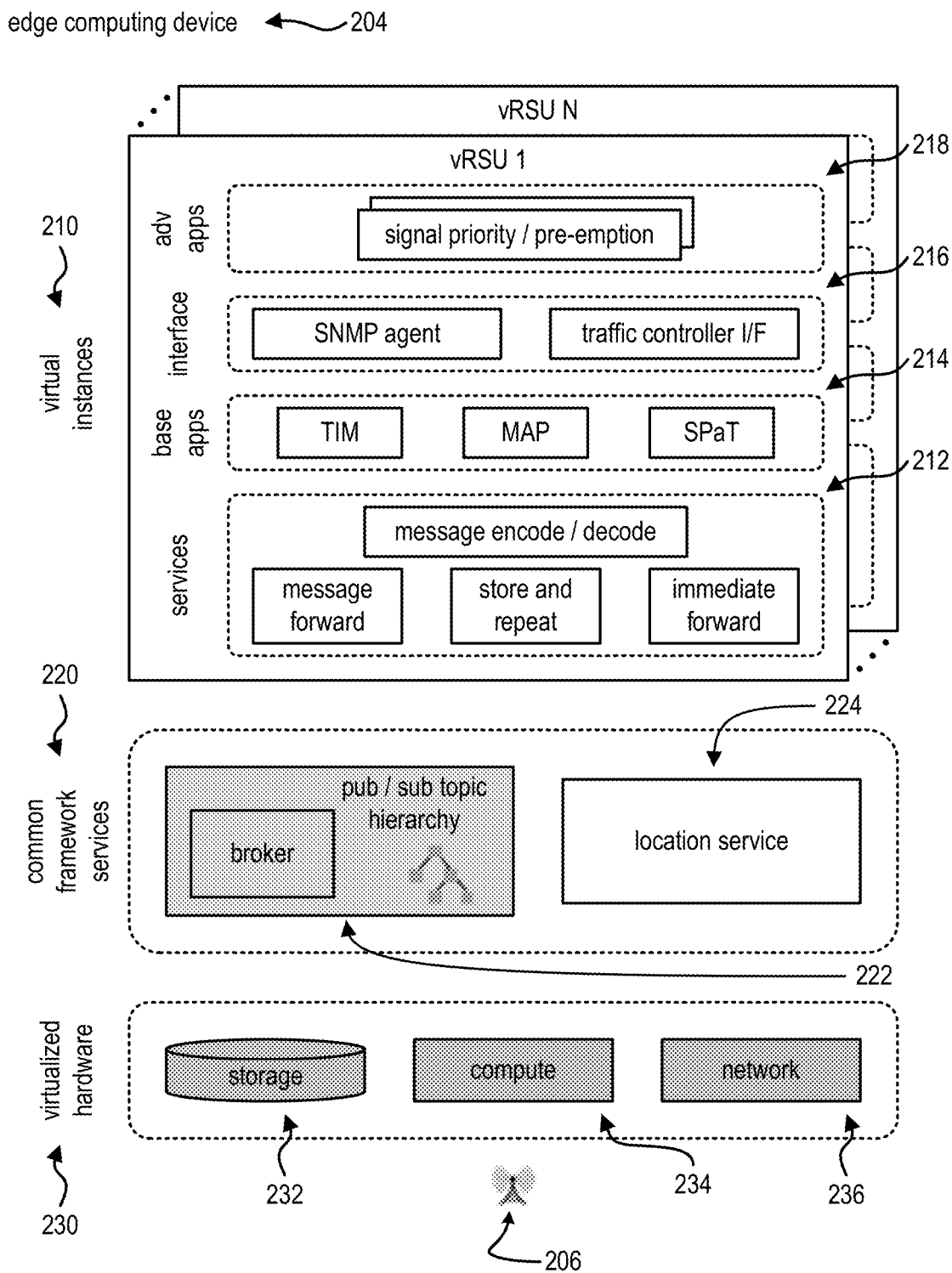
FIG. 2 shows an architecture of a vRSU system, in accordance with one or more embodiments of the present disclosure.
Figure 3:
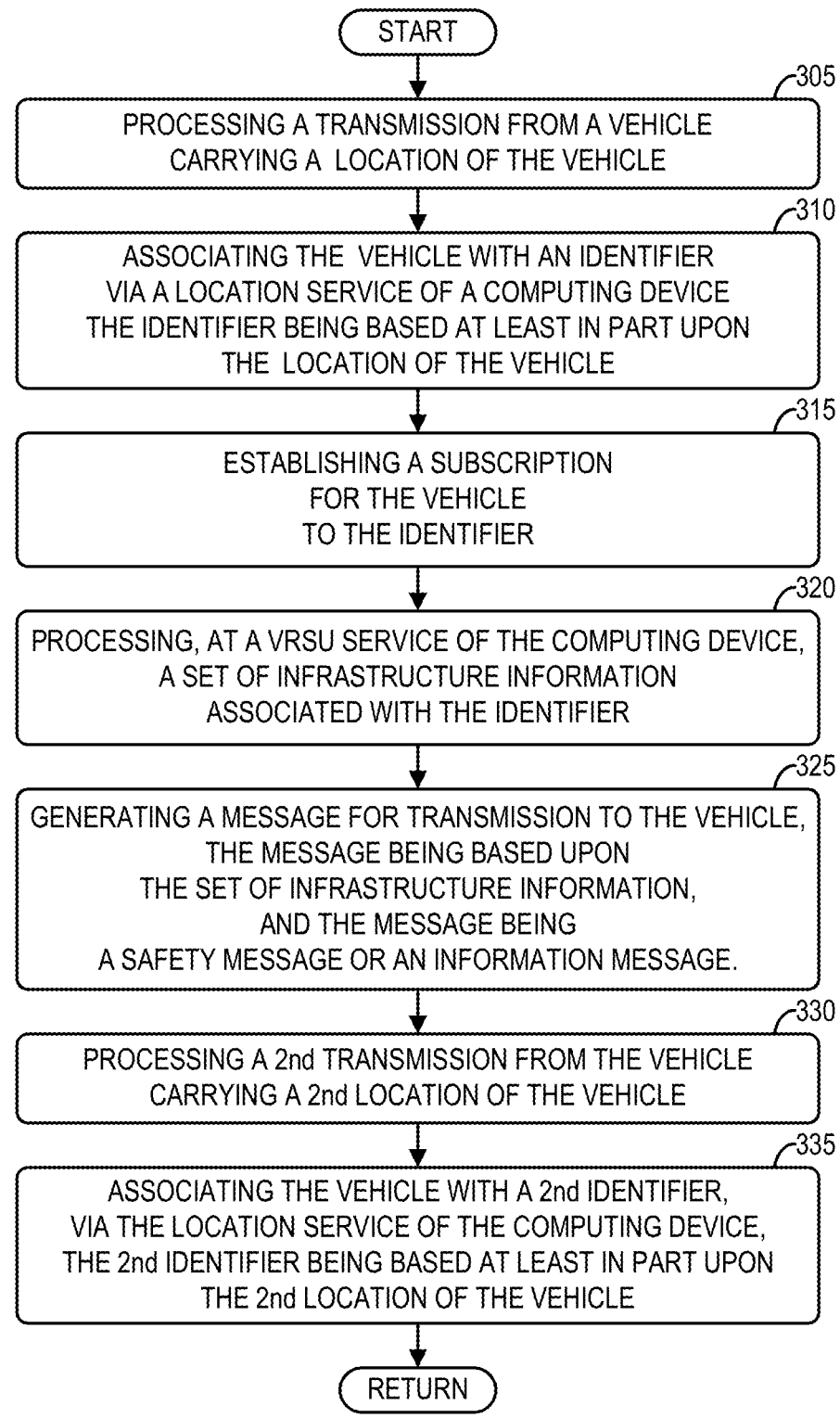
FIGS. 3-4B show methods for implementing vRSUs, in accordance with one or more embodiments of the present disclosure.

Disclosed herein are systems and methods for implementing virtualized Road-Side Units (RSUs) and vRSU-based infrastructure-information communication. FIG. 1 depicts a scenario of vRSU deployment in edge computing devices, and interaction between an edge computing device and vehicles. FIG. 2 depicts an architecture of an edge computing device implementing (e.g., running) one or more vRSU services. FIGS. 3 through 4B depict methods for implementing vRSU-based communication of infrastructure information. FIG. 5 depicts a system supporting vRSU-based communication of infrastructure information As used herein, the terms "substantially the same as" or "substantially similar to" are construed to mean the same as with a tolerance for variation that a person of ordinary skill in the art would recognize as being reasonable. As used herein, an element or step recited in the singular and proceeded with the word "a" or "an" should be understood as not excluding plural of said elements or steps, unless such exclusion is stated. As used herein, terms such as "first," "second," "third," and so on are used merely as labels, and are not intended to impose any numerical requirements, any particular positional order, or any sort of implied significance on their objects. As used herein, terminology in which "an embodiment," "some embodiments," or "various embodiments" are referenced signify that the associated features, structures, or characteristics being described are in at least some embodiments, but are not necessarily in all embodiments. Moreover, the various appearances of such terminology do not necessarily all refer to the same embodiments. As used herein, terminology in which elements are presented in a list using "and/or" language means any combination of the listed elements. For example, "A, B, and/or C" may mean any of the following: A alone; B alone; C alone; A and B; A and C; B and C; or A, B, and C.

FIG. 1 shows a scenario 100 of a deployment of vRSUs for Vehicle-to-Everything (V2X) communication. In scenario 100, an edge computing device 104 services a first vehicle 110 and a second vehicle 120 traveling on a roadway 102, as well as a roadside infrastructure unit 130. First vehicle 110 is in wireless communication with edge computing device 104 over a first communication link 112, second vehicle 120 is in wireless communication with edge computing device 104 over a second communication link 122, and roadside infrastructure unit 130 is in wireless communication with edge computing device 104 over a third communication link 132.

Edge computing device 104 may be part of a Road Operator (RO) network 150, which may comprise a variety of edge computing devices and/or a variety of communication links. In various embodiments, edge computing device 104 may include one or more servers, such as one or more blade servers. Roadside infrastructure unit 130, which in various embodiments may include hardware for interfacing with and/or controlling one or more traffic signaling devices and/or other roadside infrastructure devices, may be in communication with (or may include) a cabinet or controller unit 140, which may have an interface to a RO network link 152 through which it is in communication with an RO Traffic Management Center (TMC) backend device 160 (e.g., a server). Edge computing device 104 and/or TMC backend device 160 may communicate over the internet with various other portions of RO network 150, such as various other remote and/or distributed edge computing devices and/or cloud computing devices of a cloud 170 of computing resources (which may include public cloud portions and/or private cloud portions).

First communication link 112, second communication link 122, and/or third communication link 132 may be, or may include, a point-to-point cellular communication link. First vehicle 110, second vehicle 120, and roadside infrastructure unit 130 may accordingly have cellular communication interfaces which may be in wireless communication with one or more cellular communication interfaces 106 of edge computing device 104 over first communication link 112, second communication link 122, and/or third communication link 132.

Edge computing device 104 instantiates and run one or more virtualized RSUs (vRSUs). Various vehicles and/or other units—such as first vehicle 110, second vehicle 120, and/or roadside infrastructure unit 130—may be associated with a particular vRSU based on their locations. A location service running on edge computing device 104 may map such vehicles and/or other units to vRSUs (e.g., the vRSUs running on edge computing device 104).

In scenario 100, instead of communicating directly with RSUs via sidelink connections, vehicles and roadside infrastructure units may communicate to vRSUs instantiated on edge computing devices (e.g., Vehicle-to-Infrastructure (V2I) communication) over point-to-point cellular communications links. Roadside infrastructure units may additionally communicate to vRSUs instantiated on edge computing devices over a wired connection of an RO network, an RO TMC backend device, and/or the internet.

FIG. 2 shows an architecture 200 of a vRSU system. In architecture 200, an edge computing device 204 may instantiate (e.g., run) one or more vRSUs 210 (e.g., vRSU services), which may communicate with external devices over one or more cellular communication interfaces 206. Edge computing device 204 may also instantiate (e.g., run) a set of common framework services 220 as well as various virtualized hardware components 230. (In various embodiments, edge computing device 204 may be substantially similar to edge computing device 104.) In various embodiments, edge computing device 204 may instantiate a number of vRSUs 210 that is configurable (e.g., by software).

In a manner similar to a physical RSU, each vRSU 210 may include a services layer 212, a base applications layer 214, an interface layer 216, and/or an advanced applications layer 218. Services layer 212 may encompass software components that are responsible for handling encoding and/or decoding of V2X standards compliant messages and for implementing V2X networking standards and related protocols for transporting messages. Services layer 212 may also implement services (e.g., services in compliance with the United States Department of Transportation (USDOT) RSU Specification version 4.1) that may enable a vRSU to transmit messages to and/or receive messages from an external entity. These services may use rely either on a backhaul connection or on software components responsible for handling encoding and/or decoding of V2X messages, to send, receive, sign, and verify messages.

Base applications layer 214 may include basic applications for transmitting standard V2I messages from the RSU, such as those defined by the Society of Automotive Engineers (SAE) and/or SAE International. These may include Signal Phase and Timing (SPaT) messages, map messages (MAP), and Traveler Information Message (TIM) messages, among others.

Interface layer 216 and advanced applications layer 218 may include components that enable the RSU to interface with and/or be managed by external entities. A Simple Network Management Protocol (SNMP) agent may enable remote management of configuration over SNMP, while a Traffic Controller Interface module may enable connectivity with various controllers at intersections for receiving SPaT messages and transmitting signal priority and/or pre-emption commands to control traffic lights.

In contrast with physical RSUs, however, vRSUs 210 might not make use of sidelink communication channels, and as a result vRSUs 210 might not instantiate software components related to sidelink network communication. In addition, vRSUs 210 might not make use of V2X security components (which may be suitable for securing broadcast communication for physical RSUs), and point-to-point cellular communications between vehicles and vRSUs (e.g., unicast communications) may be secured using authentication methods used by cellular network operators (e.g., subscriber identification module (SIM) card based authentication) and/or application-level security protocols, such as a Transport Layer Security (TLS) protocol. In various embodiments, one or more TLS keys may be secured using cloud-based Hardware Security Modules (HSMs) and/or other hardware-supported mechanisms available on hosting central processing units and/or platforms.

Common framework services 220 may comprise a publisher/subscriber broker 222 and a location service 224. Publisher/subscriber broker 222 may facilitate secure connections between remote software components and local software components and may also facilitate the exchange of messages, such as through topics. A topic may provide a logical communication channel between a publisher of information (e.g., a vRSU) and a subscriber to that information (e.g., a vehicle). The topics may be arranged hierarchically, such as by topic namespaces.

In some embodiments, topics may be arranged by a topic namespace, such as a file system namespace. A publisher may publish to a specific topic (e.g., to a specific topic name), and a subscriber can then access that specific topic (e.g., by that specific topic name) to receive messages published to that topic. Information published to a topic, for the benefit of subscribers to that topic (e.g., subscribing vehicles, may include information about a driving environment, such as roadwork information, map information, and/or traffic-light information. In some embodiments, publishers and/or subscribers may use topic names with one or more "wild card" characters. In namespaces like file-system namespaces, the use of topic names with one or more "wild card" characters may enable publishers and/or subscribers to access, for example, a topic of a particular topic name and all its subtopics (e.g., within a hierarchy of the namespace).

Location service 224 may connect a vehicle to a specific vRSU. Each vRSU may serve a virtual coverage region, and a vehicle in that virtual coverage region may be served by that vRSU. Accordingly, the specific vRSU to which a vehicle may connect may be based on factors such as that vehicle's geographic location and which vRSU serves the geographic region encompassing that geographic location.

Location service 224 and vRSUs 210 may use a publisher/subscriber messaging model and topics (e.g., as implemented by publisher/subscriber broker 222) to send messages to each other. In various embodiments, topic names may be constructed based on a region and/or a type of service requested, e.g., using a predefined convention. For example, location service 224 may determine that a vehicle is at a geographic location encompassed by a geographic region served by a vRSU 210, and publisher/subscriber broker 222 may subscribe the vehicle to a topic having a name based upon the geographic region served by that vRSU 210.

In some embodiments, the topic name may be based upon a range of latitudes and/or a range of longitudes. For some embodiments, a topic name may be based upon a region identified by an index corresponding to an entry in a look-up table. In some embodiments, geographic regions served by a topic namespace may have a hierarchical structure, such that larger geographic regions may correspond with one level of hierarchy, and smaller geographic regions encompassed by a larger geographic region may correspond with sub-levels underneath a level of hierarchy corresponding with the larger geographic region.

vRSUs 210 may be associated with various virtualized hardware components 230 of edge computing device 204. In various instances, portions of physical resources of edge computing device 204 may be partitioned for use by vRSUs 210. Virtualized hardware components 230 may comprise storage resources 232, compute resources 234, and/or network resources 236, which may be divided in a static, dynamic, or hybrid manner to serve the various vRSUs 210. Accordingly, parts of various memory or storage devices, and parts of various processing cores or computing units, and parts of various networking-hardware resources of edge computing device 204 may be assigned to each of vRSUs 210.

Although reference has been made to U.S. regional standards regarding the vRSUs described herein, such concepts related to the systems and methods may be applicable with respect to similar concepts in other regions, such as in the European Union (e.g., with respect to European Telecommunications Standards Institute (ETSI) standards) or China (e.g., with respect to China Society of Automotive Engineers (CSAE) standards). Concepts related to the systems and methods discussed herein may thus be used to virtualize RSUs in other regions.

With reference to FIGS. 1 and 2, a vehicle (such as first vehicle 110 and/or second vehicle 120) may communicate with vRSUs with which they are associated (such as vRSUs instantiated by edge computing device 104 and/or edge computing device 204), and may transmit information to the vRSUs and receive information from the associated vRSUs. A vehicle may use a cloud server at a well-known end point to get a service listing and/or a resource endpoint corresponding with a nearest edge server (e.g., an edge computing device 104 and/or edge computing device 204). The vehicle may open a secure connection with the edge server over a point-to-point cellular communication link, the security of which may be established using authentication methods used by cellular network operators (e.g., SIM card based authentication) and/or application-level security protocols (e.g., a Transport Layer Security (TLS) protocol). The vehicle may publish its location (or an SAE equivalent message containing a location) to a topic, for example at regular intervals.

In various embodiments, a message transmitted by the vehicle over the point-to-point cellular communication link may carry both a first portion having a predetermined message format, such as for a standards-defined message (e.g., in accordance with a predetermined standard), and a second portion carrying metadata. Standard-defined messages may be sent in an encoded form, which may advantageously enhance an economy of the transmission of the message, and may be decoded by a receiver prior to accessing the information in the message, such as the information in the first portion. In comparison, the metadata in the second portion might not be encoded.

Metadata in the second portion may include a message-generation timestamp, for example. In various embodiments, location information from the first portion (such as for a standards-defined message) may also be among the metadata carried by the second portion, which may advantageously facilitate quick access to that information without having to decode the message.

A location service (such as location service 224) that may be subscribing the topic, or administering topics for a geographical region encompassing a location of the vehicle, may associate the vehicle with one of the vRSUs by constructing a topic name for the requested service, and providing the vehicle with the topic name for the vehicle to publish to in sending messages to the associated vRSU.

Each of the vRSUs may publish infrastructure messages to appropriate message topics, as discussed herein. Depending upon which services may be of interest to a vehicle (e.g., may have been indicated as being of interest to a vehicle), the vehicle may subscribe to a given topic to receive infrastructure-based messages and/or other vehicle-based messages. The vehicle may also publish to the given topic, for purposes of sending messages. When the vehicle reaches a vRSU's region boundary, the location service may send new topic information to a vehicle, and the vehicle may publish information to that topic and subscribe to information related to that topic.

FIGS. 3-4B show methods for implementing vRSUs, in accordance with one or more embodiments of the present disclosure. In FIG. 3, a method 300 comprises a processing 305, an associating 310, an establishing 315, a processing 320, a generating 325, a processing 330, and/or an associating 335. In processing 305, a transmission from a vehicle carrying a location of the vehicle may be processed by a computing device, such as an edge computing device (e.g., edge computing device 104 and/or edge computing device 204). For associating 310, a vehicle may be associated with an identifier, such as via a location service of the computing device, the identifier being based at least in part upon the location of the vehicle. In establishing 315, a subscription to the identifier may be established for the vehicles, such as by a publisher/subscriber broker (e.g., publisher/subscriber broker 222). In processing 320, a set of infrastructure information associated with the identifier, such as information received by and/or carried by V2X messages, may be processed at a vRSU service of the computing device (e.g., vRSU 210). In generating 325, based upon the processing of the set of infrastructure information at the vRSU service, a message may be generated for transmission to the vehicle, the message being based upon the set of infrastructure information. In various embodiments, the message may be a safety message and/or an information message.

In some embodiments, the message may be for transmission over a point-to-point wireless cellular communication link, such as an LTE cellular communications link or a 5G cellular communications link (e.g., via a cellular communication interface 106 and/or a cellular communication interface 206). For some embodiments, the point-to-point wireless cellular communication link may have a security provision based upon compliance with a protocol, such as an application-level security protocol. In various embodiments, such an application-level security protocol may include a TLS protocol, a Datagram Transport Layer Security (DTLS) protocol, and/or a Hypertext Transfer Protocol Secure (HTTPS) protocol.

In some embodiments, the vRSU service may be associated with the identifier based upon the location of the vehicle. For some embodiments, the identifier may be based in part upon a configurable geographical area for the vRSU service.

For some embodiments, the identifier may be a topic name. In some embodiments, a subscription may be established, for the vehicle, to the topic name, and in some embodiments, the set of infrastructure information may be published the topic name.

In some embodiments, the vRSU service may be one of a configurable number of vRSU services of the computing device. For some embodiments, the message may be a SPaT message, a MAP message, and/or a TIM message.

In various embodiments, a vehicle may communicate with an edge computing device multiple times, such as in order to provide information regarding a new location of the vehicle. Accordingly, for example, the transmission may be a first transmission, the location may be a first location, and the identifier may be a first identifier. In such embodiments, in processing 330, a second transmission from the vehicle carrying a second location of the vehicle may be processed; and in associating 335, the vehicle may be associated with a second identifier, via the location service of the computing device, the second identifier being based at least in part upon the second location of the vehicle.

Figure 4A:
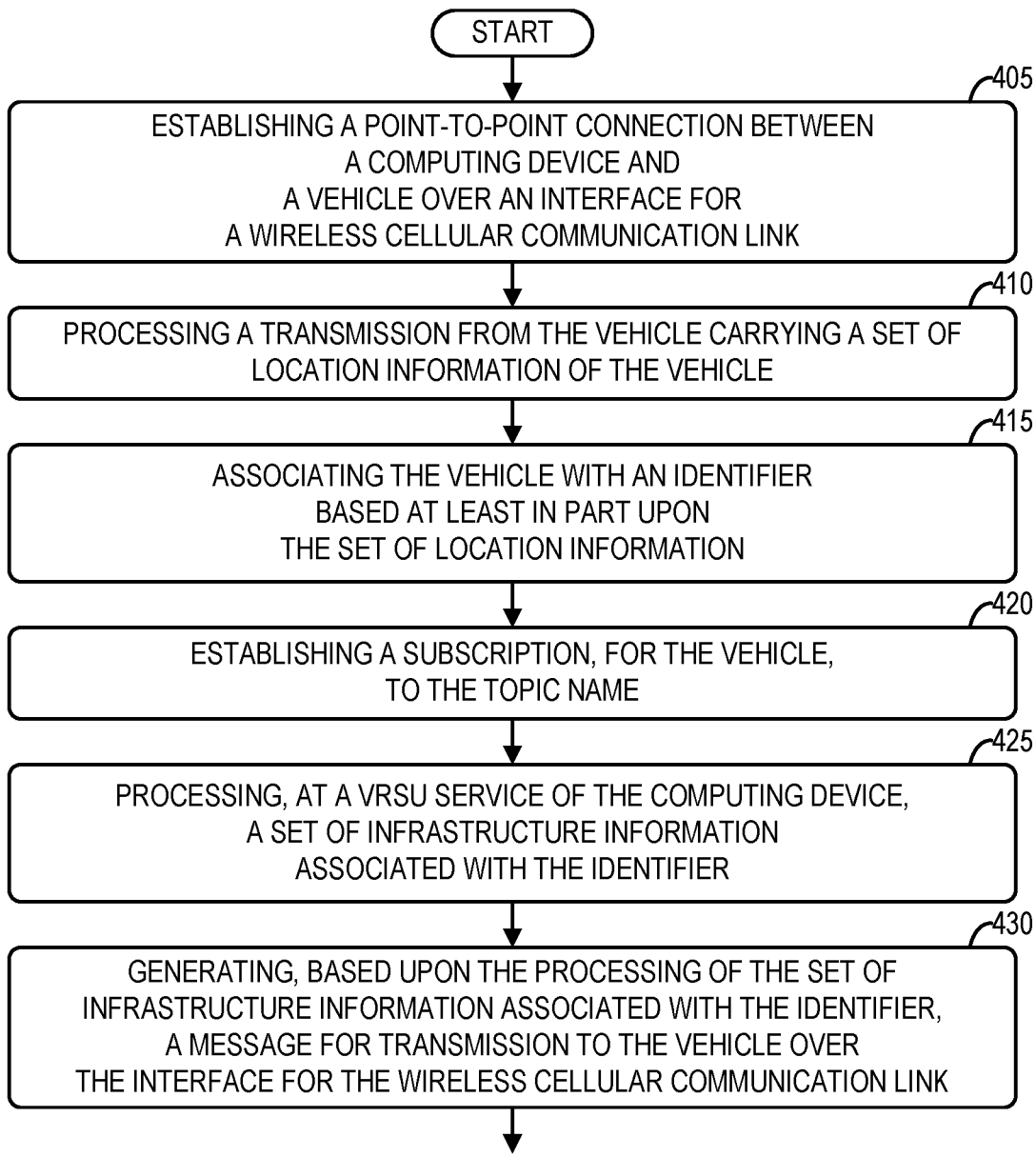
Figure 4B:
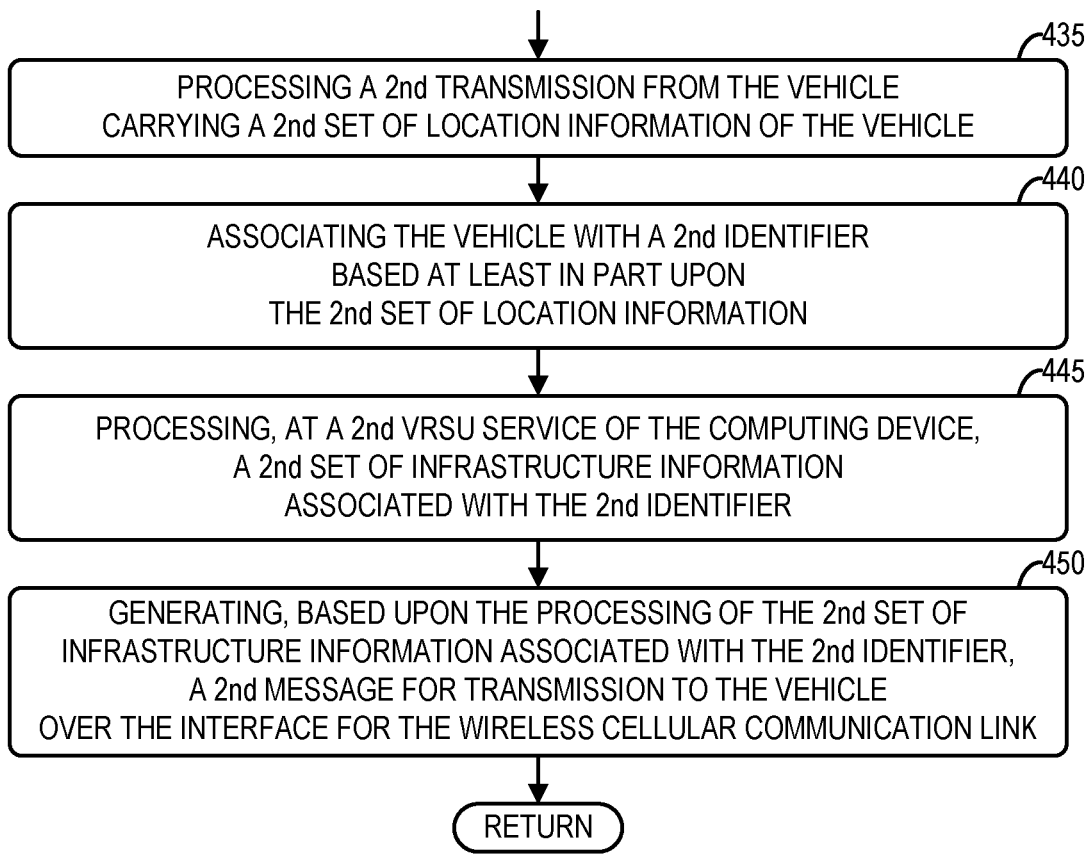
Figure 5:
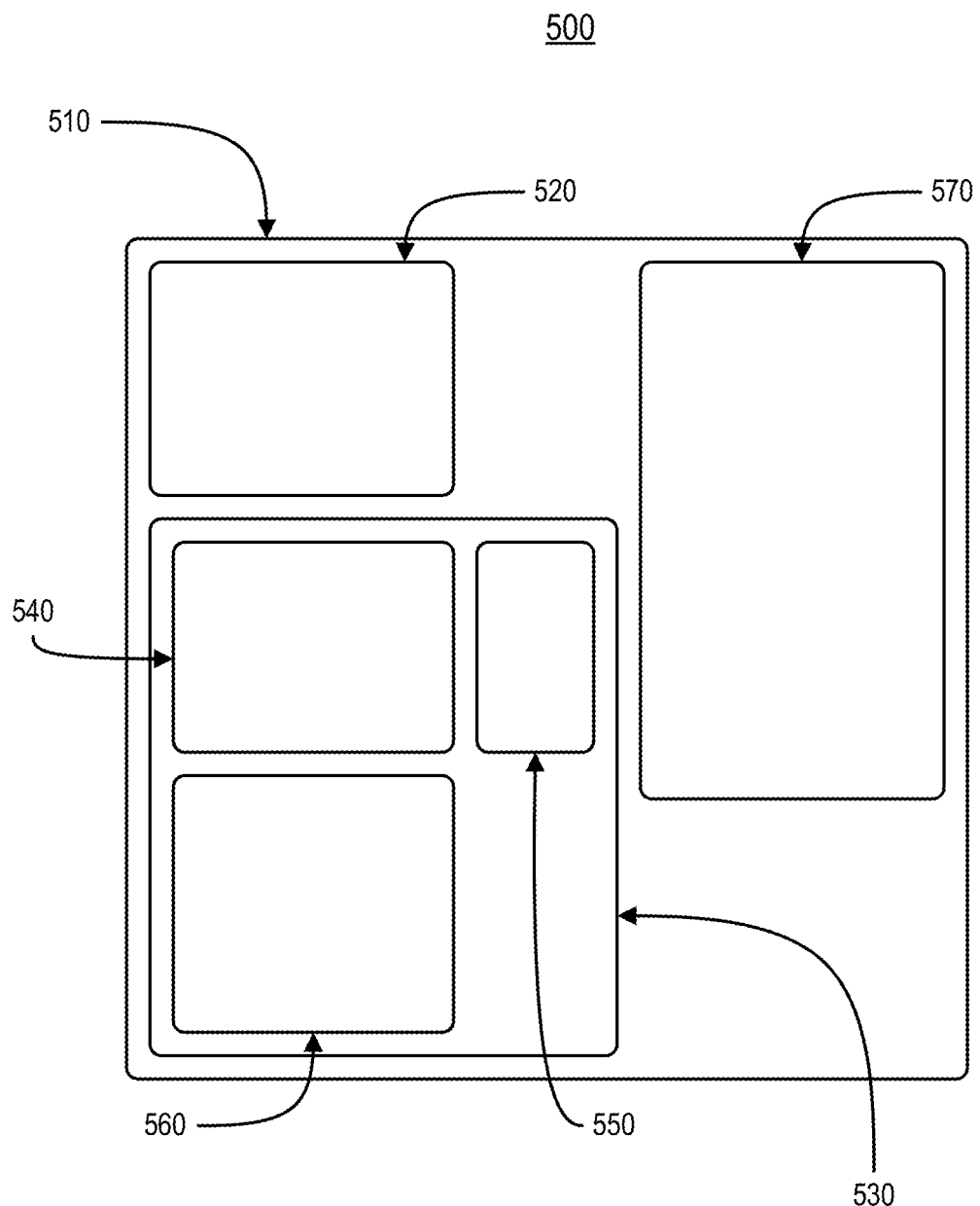
FIG. 5 shows a system for implementing vRSUs, in accordance with one or more embodiments of the present disclosure.

In FIGS. 4A and 4B, a method 400 of virtualizing an RSU comprises an establishing 405, a processing 410, an associating 415, an establishing 420, a processing 425, a generating 430, a processing 435, an associating 440, a processing 445, and/or a generating 450. In establishing 405, a point-to-point connection may be established between a computing device, such as an edge computing device (e.g., edge computing device 104 and/or edge computing device 204) and a vehicle over an interface for a wireless cellular communication link (e.g., one of cellular communication interfaces 106 and/or cellular communication interface 206). In processing 410, a transmission from the vehicle carrying a set of location information of the vehicle may be processed by the computing device. In associating 415, the vehicle may be associated with an identifier based at least in part upon the set of location information. In processing 425, a set of infrastructure information associated with the identifier may be processed at a vRSU service of the computing device (e.g., one of vRSUs 210). In generating 430, a message for transmission to the vehicle over the interface for the wireless cellular communication link may be generated based upon the processing of the set of infrastructure information associated with the identifier.

In some embodiments, the identifier may be a topic name. In some embodiments, a subscription may be established, for the vehicle, to the topic name, and in some embodiments, the set of infrastructure information may be published to the topic name.

For some embodiments, the vRSU service may be associated with the identifier based upon the set of location information from the vehicle. In some embodiments, the identifier may be based in part upon a configurable geographical area for the vRSU service. For some embodiments, the vRSU service may be one of a configurable number of vRSU services of the computing device.

In various embodiments, a vehicle may communicate with an edge computing device multiple times, such as in order to provide information regarding a new location of the vehicle. Accordingly, for example, the transmission may be a first transmission, the set of location information may be a first set of location information, the identifier may be a first identifier, the vRSU service may be a first vRSU service of the computing device, the set of infrastructure information may be a first set of infrastructure information, and the message may be a first message. In such embodiments, in processing 435, a second transmission from the vehicle carrying a second set of location information of the vehicle may be processed by the computing device; in associating 440, the vehicle may be associated with a second identifier based at least in part upon the second set of location information; in processing 445, a second set of infrastructure information associated with the second identifier may be processed at a second vRSU service of the computing device; and in generating 450, a second message for transmission to the vehicle over the interface for the wireless cellular communication link may be generated based upon the processing of the second set of infrastructure information associated with the second identifier.

FIG. 5 shows a system for implementing vRSUs. System 500 may comprise a case 510, a power source 520, an interconnection board 530, one or more processors 540, one or more non-transitory memories 550, one or more input/output (I/O) interfaces 560, and/or one or more media drives 570.

Memories 550 may have executable instructions stored therein that, when executed, cause processors 540 to perform various operations, as disclosed herein. I/O interfaces 560 may include, for example, one or more interfaces for wired connections (e.g., Ethernet connections) and/or one or more interfaces for wireless connections (e.g., Wi-Fi and/or cellular connections).

System 500 may be a vRSU system include an edge computing device (e.g., edge computing device 104 and/or edge computing device 106) instantiating one or more vRSUs. System 500 may comprise one or more antennas supporting transmission and reception over a wireless cellular communication link between the system and a vehicle (e.g., one of cellular communication interfaces 106 and/or cellular communication interface 206).

Processors 540 may establish a point-to-point connection over the wireless cellular communication link. Processors 540 may also process a transmission from the vehicle carrying a set of location information of the vehicle (such as a transmission received by the wireless cellular communication link and provided to processors 540). Processors 540 may associate a vehicle with an identifier, via a location service of the system (e.g., location service 224), the identifier being based at least in part upon the set of location information of the vehicle. Processors 540 may establish a subscription, for the vehicle, to the identifier, such as by a publisher/subscriber broker (e.g., publisher/subscriber broker 222). Processors 540 may also process, at a vRSU service of the system, a set of infrastructure information associated with the identifier. Processors 540 may publish the set of infrastructure information to the identifier, such as by the publisher/subscriber broker. Processors 540 may generate, based upon the subscription of the vehicle to the identifier, a message for transmission to the vehicle over the wireless cellular communication link, the message being based upon the set of infrastructure information.

In various embodiments, the point-to-point wireless cellular communication link may have a security provision based upon compliance with a protocol selected from a group consisting of: a TLS protocol; a DTLS protocol; and an HTTPS protocol. The vRSU service may be one of a configurable number of vRSU services of the computing device. The identifier may be based in part upon a configurable geographical area for the vRSU service.

In various embodiments, a vehicle may communicate with system 540 multiple times, such as in order to provide information regarding a new location of the vehicle. Accordingly, for example, the transmission may be a first transmission, the set of location information may be a first set of location information, the identifier may be a first identifier, the vRSU service may be a first vRSU service of the system, the set of infrastructure information may be a first set of infrastructure information, and the message may be a first message. Processors 540 may process a second transmission from the vehicle carrying a second set of location information of the vehicle. Processors 540 may associate the vehicle with a second identifier, via the location service of the system, the second identifier being based at least in part upon the second set of location information. Processors 540 may establish a subscription, for the vehicle, to the second identifier, such as by a publisher/subscriber broker (e.g., publisher/subscriber broker 222). Processors 540 may process, at a second vRSU service of the system, a second set of infrastructure information associated with the second identifier. Processors 540 may publish the second set of infrastructure information to the second identifier. Processors 540 may generate, based upon the subscription of the vehicle to the second identifier, a second message for transmission to the vehicle over the wireless cellular communication link, the second message being based upon the second set of infrastructure information.

Moreover, system 500 (and/or other systems and devices disclosed herein) may be configured in accordance with the systems discussed herein. For example, system 500 may be employed in a scenario substantially similar to scenario 100, may include an architecture substantially similar to architecture 200, and/or may undertake methods substantially similar to methods 300 and 400. Thus, the same advantages that apply to the systems and methods discussed herein may apply to system 500.

As discussed herein, the systems and methods for providing infrastructure information to vehicles through the use of vRSUs may have a wide variety of significant advantages.

In various embodiments, the use of vRSUs instead of dedicated physical RSU hardware may lead to significant reductions in capital expenditures and/or operational expenditures. In some cases, the reductions may amount to between a 10× reduction in costs and a 100× reduction in costs. The reduced production of dedicated physical RSU hardware may also have positive environmental impacts.

For various embodiments, the instantiation of vRSUs using edge computing devices may result in the vRSUs being closer to vehicles. This may advantageously achieve reduced latencies and/or increased localization. Latencies may be lower compared to traditional cloud-based solutions, which may enable new classes of latency-critical and/or safety-critical applications.

In various embodiments, the systems and methods herein may advantageously facilitate vRSU deployment configurability. For some embodiments, a vRSU density per roadway-mile may be software-configurable, for example, and localization may accordingly be dynamic. For some embodiments, localization (e.g., vRSU density) may be changed using configuration values of a location service (e.g., of an edge computing device, as discussed herein).

For various embodiments, the use of cellular communication links (e.g., air interface or Uu interface communication links), and/or the use of point-to-point cellular communication links, may simplify security provisions relative to sidelink communication links and/or broadcast communication links. In general, V2X communication may be supported without depending upon the use of sidelink communication links, and by instead using cellular technologies that are already available in vehicles (e.g., technologies compliant with Long Term Evolution (LTE) cellular communication specifications, Fifth Generation (5G) cellular communication specifications, and so on).

In various embodiments, the systems and methods discussed herein may reduce upstream traffic (e.g., communications from vehicles), by using edge computing devices inside an RO's network. For example, the subscriber and publisher model of the systems and methods discussed herein may reduce upstream traffic.

For various embodiments, software decomposition may advantageously allow layers used in instantiated vRSUs to be substantially similar to, and/or the same as, layers used in physical RSUs.

In various embodiments, processing performed by resource-constrained embedded devices (e.g., physical RSUs) may advantageously be moved to edge computing devices without compromising on performance and/or security.

For various embodiments, the publisher and subscriber model incorporating dynamic construction of topic namespace based on location, requester identifier (ID), and service context may advantageously facilitate the routing of messages in a secure and scalable manner. The methods and systems discussed herein may also have the advantage of better scalability and/or expandability, which may enable them to cover broader regions, and the methods and systems may take advantage of edge computing models (e.g., Infrastructure-as-a-Service (IaaS) models) to scale and upgrade hardware resources. Software upgrades may also benefit from easier rollout and/or maintenance processes.

In various embodiments, the systems and methods discussed herein may advantageously support both SAE message set and custom message sets. The use of SAE message-sets may advantageously maintain interoperability with V2X-equipped devices (e.g., existing infrastructure). This may increase flexible deployment to address both existing and future scenarios. New cellular technologies (e.g., 5G and/or subsequent technologies) may also be leveraged automatically to improve service level agreements (examples of which may include New Radio (NR) technologies and/or network slicing technologies).

For various embodiments, the systems and methods herein may advantageously use software-defined networking (SDN) and standards-based cellular communication links to provide connectivity between vehicles and edge services (e.g., services administered by edge computing devices). In addition, the systems and methods disclosed herein might not require dedicated spectrum, and might instead operate over existing cellular licensed spectrum.

In various embodiments, the systems and methods disclosed herein may advantageously use existing subscriber authentication methods (e.g., SIIM-based authentication), cloud-based HSMs, and/or application-level security to secure V2I communication. The methods and systems disclosed herein may accordingly benefit from the use of point-to-point communication and standard application-level security (such as a TLS security protocol).

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the edge computing devices and systems described above with respect to FIGS. 1, 2, and 5. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The disclosure provides support for a method comprising: associating a vehicle with an identifier, via a location service of a computing device, the identifier being based at least in part upon a location of the vehicle, processing, at a vRSU service of the computing device, a set of infrastructure information associated with the identifier, and generating, based upon the processing of the set of infrastructure information at the vRSU service, a message for transmission to the vehicle, the message being based upon the set of infrastructure information, and the message being selected from a group consisting of: a safety message, and an information message. In a first example of the method, the vRSU service is associated with the identifier based upon the location of the vehicle. In a second example of the method, optionally including the first example, the message is for transmission over a point-to-point wireless cellular communication link. In a third example of the method, optionally including one or both of the first and second examples, the point-to-point wireless cellular communication link has a security provision based upon compliance with a protocol selected from a group consisting of: a TLS protocol, a DTLS protocol, and a HTTPS protocol. In a fourth example of the method, optionally including one or more or each of the first through third examples comprising: establishing a subscription, for the vehicle, to the identifier. In a fifth example of the method, optionally including one or more or each of the first through fourth examples comprising: processing a transmission from the vehicle carrying the location of the vehicle. In a sixth example of the method, optionally including one or more or each of the first through fifth examples, the transmission is a first transmission, the location is a first location, and the identifier is a first identifier, comprising: processing a second transmission from the vehicle carrying a second location of the vehicle, and associating the vehicle with a second identifier, via the location service of the computing device, the second identifier being based at least in part upon the second location of the vehicle. In a seventh example of the method, optionally including one or more or each of the first through sixth examples, the vRSU service is one of a configurable number of vRSU services of the computing device. In an eighth example of the method, optionally including one or more or each of the first through seventh examples, the message is selected from a group consisting of: a SPaT message, and a MAP message. In a ninth example of the method, optionally including one or more or each of the first through eighth examples, the identifier is based in part upon a configurable geographical area for the vRSU service. In a tenth example of the method, optionally including one or more or each of the first through ninth examples, the identifier is a topic name. In an eleventh example of the method, optionally including one or more or each of the first through tenth examples comprising: establishing a subscription, for the vehicle, to the topic name. In a twelfth example of the method, optionally including one or more or each of the first through eleventh examples comprising: publishing the set of infrastructure information to the topic name.

The disclosure also provides support for a method of virtualizing an RSU, the method comprising: establishing a point-to-point connection between a computing device and a vehicle over an interface for a wireless cellular communication link, processing a transmission from the vehicle carrying a set of location information of the vehicle, associating the vehicle with an identifier based at least in part upon the set of location information, processing, at a vRSU service of the computing device, a set of infrastructure information associated with the identifier, and generating, based upon the processing of the set of infrastructure information associated with the identifier, a message for transmission to the vehicle over the interface for the wireless cellular communication link. In a first example of the method, the identifier is a topic name, comprising: establishing a subscription, for the vehicle, to the topic name, and publishing the set of infrastructure information to the topic name, and wherein the vRSU service is associated with the identifier based upon the set of location information from the vehicle. In a second example of the method, optionally including the first example, the vRSU service is one of a configurable number of vRSU services of the computing device, and wherein the identifier is based in part upon a configurable geographical area for the vRSU service. In a third example of the method, optionally including one or both of the first and second examples, the transmission is a first transmission, the set of location information is a first set of location information, the identifier is a first identifier, the vRSU service is a first vRSU service of the computing device, the set of infrastructure information is a first set of infrastructure information, and the message is a first message, comprising: processing a second transmission from the vehicle carrying a second set of location information of the vehicle, associating the vehicle with a second identifier based at least in part upon the second set of location information, processing, at a second vRSU service of the computing device, a second set of infrastructure information associated with the second identifier, and generating, based upon the processing of the second set of infrastructure information associated with the second identifier, a second message for transmission to the vehicle over the interface for the wireless cellular communication link.

The disclosure also provides support for a vRSU system, comprising: one or more antennas supporting transmission and reception over a wireless cellular communication link between the system and a vehicle, one or more processors, and a non-transitory memory having executable instructions that, when executed, cause the one or more processors to: establish a point-to-point connection over the wireless cellular communication link, process a transmission from the vehicle carrying a set of location information of the vehicle, associate a vehicle with an identifier, via a location service of the system, the identifier being based at least in part upon the set of location information of the vehicle, establish a subscription, for the vehicle, to the identifier, process, at a vRSU service of the system, a set of infrastructure information associated with the identifier, publish the set of infrastructure information to the identifier, and generate, based upon the subscription of the vehicle to the identifier, a message for transmission to the vehicle over the wireless cellular communication link, the message being based upon the set of infrastructure information. In a first example of the system, the point-to-point wireless cellular communication link has a security provision based upon compliance with a protocol selected from a group consisting of: a TLS protocol, a DTLS protocol, and a HTTPS protocol, wherein the vRSU service is one of a configurable number of vRSU services of the computing device, and wherein the identifier is based in part upon a configurable geographical area for the vRSU service. In a second example of the system, optionally including the first example, the transmission is a first transmission, the set of location information is a first set of location information, the identifier is a first identifier, the vRSU service is a first vRSU service of the system, the set of infrastructure information is a first set of infrastructure information, and the message is a first message, the executable instructions, when executed, causing the one or more processors to: process a second transmission from the vehicle carrying a second set of location information of the vehicle, associate the vehicle with a second identifier, via the location service of the system, the second identifier being based at least in part upon the second set of location information, establish a subscription, for the vehicle, to the second identifier, process, at a second vRSU service of the system, a second set of infrastructure information associated with the second identifier, publish the second set of infrastructure information to the second identifier, and generate, based upon the subscription of the vehicle to the second identifier, a second message for transmission to the vehicle over the wireless cellular communication link, the second message being based upon the second set of infrastructure information.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
associating a vehicle with an identifier, via a location service of a computing device, the identifier being based at least in part upon a location of the vehicle;
processing, at a virtual Road-Side Unit (vRSU) service of the computing device, a set of infrastructure information associated with the identifier;
generating, based upon the processing of the set of infrastructure information at the vRSU service, a message for transmission to the vehicle, the message being based upon the set of infrastructure information, and the message being selected from a group consisting of: a safety message, and an information message; and
processing a transmission from the vehicle carrying the location of the vehicle, wherein the transmission is a first transmission, the location is a first location, and the identifier is a first identifier, comprising:
processing a second transmission from the vehicle carrying a second location of the vehicle; and
associating the vehicle with a second identifier, via the location service of the computing device, the second identifier being based at least in part upon the second location of the vehicle.

2. The method of claim 1,
wherein the vRSU service is associated with the identifier based upon the first location of the vehicle.

3. The method of claim 1,
wherein the message is transmitted over a point-to-point wireless cellular communication link.

4. The method of claim 3,
wherein the point-to-point wireless cellular communication link has a security provision based upon compliance with a protocol selected from a group consisting of: a Transport Layer Security (TLS) protocol; a Datagram Transport Layer Security (DTLS) protocol; and a Hypertext Transfer Protocol Secure (HTTPS) protocol.

5. The method of claim 1, comprising:
establishing a subscription, for the vehicle, to the identifier.

6. The method of claim 1,
wherein the vRSU service is one of a configurable number of vRSU services of the computing device.

7. The method of claim 1,
wherein the message is selected from a group consisting of: a Signal Phase and Timing (SPaT) message; and a Map Data (MAP) message.

8. The method of claim 1,
wherein the first identifier is based in part upon a configurable geographical area for the vRSU service.

9. The method of claim 1,
wherein the first identifier is a topic name.

10. The method of claim 9, comprising:
establishing a subscription, for the vehicle, to the topic name.

11. The method of claim 9, comprising:
publishing the set of infrastructure information to the topic name.

12. A method of virtualizing a road-side unit (RSU), the method comprising:
　　establishing a point-to-point connection between a computing device and a vehicle over an interface for a wireless cellular communication link;
　　processing a transmission from the vehicle carrying a set of location information of the vehicle;
　　associating the vehicle with an identifier based at least in part upon the set of location information;
　　processing, at a virtual RSU (vRSU) service of the computing device, a set of infrastructure information associated with the identifier; and
　　generating, based upon the processing of the set of infrastructure information associated with the identifier, a message for transmission to the vehicle over the interface for the wireless cellular communication link,
wherein the computing device is an edge computing device, and wherein the transmission is a first transmission, the set of location information is a first set of location information, the identifier is a first identifier, the vRSU service is a first vRSU service of the computing device, the set of infrastructure information is a first set of infrastructure information, and the message is a first message, comprising:
　　processing a second transmission from the vehicle carrying a second set of location information of the vehicle;
　　associating the vehicle with a second identifier based at least in part upon the second set of location information;
　　processing, at a second vRSU service of the computing device, a second set of infrastructure information associated with the second identifier; and
　　generating, based upon the processing of the second set of infrastructure information associated with the second identifier, a second message for transmission to the vehicle over the interface for the wireless cellular communication link.

13. The method of claim 12, wherein the first identifier is a topic name, comprising:
　　establishing a subscription, for the vehicle, to the topic name; and
　　publishing the set of infrastructure information to the topic name,
　　and wherein the vRSU service is associated with the first identifier based upon the set of location information from the vehicle.

14. The method of claim 12,
wherein the vRSU service is one of a configurable number of vRSU services of the computing device; and
wherein the first identifier is based in part upon a configurable geographical area for the vRSU service.

15. A virtual Road-Side Unit (vRSU) system, comprising:
　　one or more antennas supporting transmission and reception over a wireless cellular communication link between the system and a vehicle;
　　one or more processors; and
　　a non-transitory memory having executable instructions that, when executed, cause the one or more processors to:
　　　　establish a point-to-point connection over the wireless cellular communication link;
　　　　process a transmission from the vehicle carrying a set of location information of the vehicle;
　　　　associate a vehicle with an identifier, via a location service of the system, the identifier being based at least in part upon the set of location information of the vehicle;
　　　　establish a subscription, for the vehicle, to the identifier;
　　　　process, at a virtual RSU (vRSU) service of the system, a set of infrastructure information associated with the identifier;
　　　　publish the set of infrastructure information to the identifier; and
　　　　generate, based upon the subscription of the vehicle to the identifier, a message for transmission to the vehicle over the wireless cellular communication link, the message being based upon the set of infrastructure information; wherein
the transmission is a first transmission, the set of location information is a first set of location information, the identifier is a first identifier, the vRSU service is a first vRSU service of the system, the set of infrastructure information is a first set of infrastructure information, and the message is a first message, the executable instructions, when executed, causing the one or more processors to:
　　process a second transmission from the vehicle carrying a second set of location information of the vehicle;
　　associate the vehicle with a second identifier, via the location service of the system, the second identifier being based at least in part upon the second set of location information;
　　establish a subscription, for the vehicle, to the second identifier;
　　process, at a second vRSU service of the system, a second set of infrastructure information associated with the second identifier;
　　publish the second set of infrastructure information to the second identifier; and
　　generate, based upon the subscription of the vehicle to the second identifier, a second message for transmission to the vehicle over the wireless cellular communication link, the second message being based upon the second set of infrastructure information.

16. The vRSU system of claim 15,
wherein the point-to-point wireless cellular communication link has a security provision based upon compliance with a protocol selected from a group consisting of: a Transport Layer Security (TLS) protocol; a Datagram Transport Layer Security (DTLS) protocol; and a Hypertext Transfer Protocol Secure (HTTPS) protocol;
wherein the vRSU service is one of a configurable number of vRSU services of the computing device; and
wherein the first identifier is based in part upon a configurable geographical area for the vRSU service.

* * * * *